US007818672B2

(12) United States Patent
McCormack et al.

(10) Patent No.: US 7,818,672 B2
(45) Date of Patent: Oct. 19, 2010

(54) FLOATING ACTION BUTTONS

(75) Inventors: Michael J McCormack, Snohomish, WA (US); Christopher W. Bryant, Seattle, WA (US); Andrew R. Miller, Issaquah, WA (US); Robert E Coggins, Bellevue, WA (US); Scott T. Gardner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 626 days.

(21) Appl. No.: 11/026,349

(22) Filed: Dec. 30, 2004

(65) Prior Publication Data

US 2006/0156247 A1 Jul. 13, 2006

(51) Int. Cl.
*G06F 3/048* (2006.01)
(52) U.S. Cl. ............... 715/715; 715/708; 715/711; 715/802; 715/821
(58) Field of Classification Search ............ 715/672, 715/673, 674, 767, 859, 808, 856, 862, 810, 715/708, 711, 715, 768, 817, 821, 840, 841, 715/843, 802
See application file for complete search history.

(56) References Cited

U.S. PATENT DOCUMENTS

| 5,181,162 | A | | 1/1993 | Smith et al. |
| 5,414,812 | A | | 5/1995 | Filip et al. |
| 5,425,140 | A | * | 6/1995 | Bloomfield et al. ......... 715/841 |
| 5,487,141 | A | | 1/1996 | Cain et al. |
| 5,491,795 | A | * | 2/1996 | Beaudet et al. ............ 715/804 |
| 5,500,936 | A | * | 3/1996 | Allen et al. ................ 715/808 |
| 5,535,389 | A | | 7/1996 | Elder et al. |
| 5,651,108 | A | | 7/1997 | Cain et al. |
| 5,790,122 | A | * | 8/1998 | Cecchini et al. ............ 715/854 |
| 5,857,197 | A | | 1/1999 | Mullins |
| 5,914,716 | A | * | 6/1999 | Rubin et al. ................ 715/779 |
| 5,940,078 | A | * | 8/1999 | Nagarajayya et al. ....... 715/859 |
| 6,014,138 | A | | 1/2000 | Cain et al. |
| 6,075,537 | A | * | 6/2000 | Adapathya et al. ......... 715/760 |
| 6,091,415 | A | * | 7/2000 | Chang et al. ............... 715/809 |
| 6,147,683 | A | * | 11/2000 | Martinez et al. ........... 715/786 |
| 6,154,750 | A | * | 11/2000 | Roberge et al. .......... 707/104.1 |
| 6,229,539 | B1 | * | 5/2001 | Morcos et al. ............. 715/808 |
| 6,467,081 | B2 | * | 10/2002 | Vaidyanathan et al. ...... 717/123 |
| 6,801,916 | B2 | * | 10/2004 | Roberge et al. ............ 707/101 |

(Continued)

OTHER PUBLICATIONS

Final Office Action dated Dec. 8, 2008 for U.S. Appl. No. 11/027,301, 20 pages.

(Continued)

*Primary Examiner*—Tadeese Hailu
(74) *Attorney, Agent, or Firm*—Lee & Hayes, PLLC

(57) ABSTRACT

A user interface (UI) includes floating action buttons. Respective hot zones are established for associated respective UI elements. When a focus is targeting (e.g., located at) a given hot zone, one or more floating action buttons that are associated therewith are presented as part of the UI. Activation of a particular action button of the one or more floating action buttons causes an action corresponding to the particular action button to be implemented. In an example implementation, the actions available through the one or more floating action buttons may be context-sensitive such that the actions thereof are tailored to the type of item corresponding to the UI element (e.g., an icon, a graphical element, a text portion, a screen area, etc.).

22 Claims, 9 Drawing Sheets

U.S. PATENT DOCUMENTS

| | | | |
|---|---|---|---|
| 6,828,729 B1* | 12/2004 | Owens et al. | 313/528 |
| 6,829,615 B2 | 12/2004 | Schirmer et al. | |
| 7,017,122 B1* | 3/2006 | Lee et al. | 715/812 |
| 7,164,410 B2* | 1/2007 | Kupka | 345/156 |
| 7,254,581 B2 | 8/2007 | Johnson et al. | |
| 7,278,092 B2* | 10/2007 | Krzanowski | 715/205 |
| 7,305,436 B2* | 12/2007 | Willis | 709/204 |
| 7,720,887 B2 | 5/2010 | McCormack et al. | |
| 7,730,067 B2 | 5/2010 | McCormack et al. | |
| 2002/0103789 A1* | 8/2002 | Turnbull et al. | 707/3 |
| 2003/0035012 A1* | 2/2003 | Kurtenbach et al. | 345/810 |
| 2004/0003096 A1* | 1/2004 | Willis | 709/228 |
| 2004/0070622 A1* | 4/2004 | Cossey et al. | 345/769 |
| 2005/0022132 A1 | 1/2005 | Herzberg et al. | |
| 2005/0091609 A1* | 4/2005 | Matthews et al. | 715/804 |
| 2005/0091641 A1* | 4/2005 | Starbuck et al. | 717/122 |
| 2005/0154986 A1 | 7/2005 | Bartek et al. | |
| 2005/0154989 A1* | 7/2005 | Maddocks et al. | 715/735 |
| 2005/0223022 A1 | 10/2005 | Weissman et al. | |
| 2005/0251754 A1* | 11/2005 | Padgett et al. | 715/779 |
| 2006/0085766 A1* | 4/2006 | Dominowska et al. | 715/854 |

OTHER PUBLICATIONS

Final Office Action dated Nov. 14, 2007 for U.S. Appl. No. 11/027,301, 21 pages.

Non-Final Office Action dated Apr. 29, 2008 for U.S. Appl. No. 11/027,301, 21 pages.

Non-Final Office Action dated Jun. 5, 2007 for U.S. Appl. No. 11/027,301, 21 pages.

Non-Final Office Action dated Aug. 19, 2009 for U.S. Appl. No. 11/027,301, 23 pages.

* cited by examiner

FLOATING ACTION BUTTONS

TECHNICAL FIELD

This disclosure relates in general to a user interface (UI) and in particular, by way of example but not limitation, to a user interface for a computing device that presents floating action buttons.

BACKGROUND

Graphical user interfaces (GUIs) have been employed as computer interfaces for over two decades. GUIs usually include icons that visually provide access to files and features, menus that textually provide access to files and features, and a pointer icon for selecting the individual icons and menu choices. Two decades ago, the total number of features offered by computer software was sufficiently limited such that they could be presented using the available screen space. However, as the numbers and types of features offered by software multiplied and proliferated, the available screen space was gradually consumed. Unfortunately, the available screen space for GUIs eventually became inadequate.

Accordingly, there is a need for schemes, mechanisms, techniques, etc. that can efficiently and conveniently enable GUIs to enable access to the multiplicity of features offered by today's software.

SUMMARY

A user interface (UI) includes floating action buttons. Respective hot zones are established for associated respective UI elements. When a focus is targeting (e.g., located at) a given hot zone, one or more floating action buttons that are associated therewith are presented as part of the UI. Activation of a particular action button of the one or more floating action buttons causes an action corresponding to the particular action button to be implemented. In an example implementation, the actions available through the one or more floating action buttons may be context-sensitive such that the actions thereof are tailored to the type of item corresponding to the UI element (e.g., an icon, a graphical element, a text portion, a screen area, etc.).

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

The description herein is directed to graphical user interfaces (GUIs). As described above, the total numbers of as well as diverse types of features that are offered by software have been increasing. In fact, such features can be increased with virtually no limitation. On the other hand, the amount of screen space available to a GUI is limited by physical monitor size and/or screen resolution.

Consequently, different schemes have been developed to increase the numbers and manners of interfacing with programs through the limited available screen space. For example, tool bar buttons are now present in many different types of software programs. Also, right-clicking an icon or designated screen area can precipitate the presentation of a menu.

Schemes, mechanisms, techniques, etc. for a novel UI are described herein. In a described implementation, when a pointer icon is located within a hover over zone of a GUI, floating action buttons are presented on the display screen. Activating a floating action button causes an action corresponding to the floating action button to be implemented. In a preferred implementation, the floating action buttons that are presented may be associated with the hover over zone such that the floating action buttons, and their corresponding actions, are context-sensitive. In addition to being sensitive to a type of item corresponding to a hover over zone, floating action buttons can also be sensitive to a mode (e.g., a status, a condition, a phase, etc.) in which a given program is currently operating or functioning.

When the pointer icon is moved beyond the hover over zone, the floating action buttons are removed from the display screen. Hence, the UI that is displayed need not be cluttered with action buttons that are not currently relevant. Floating action buttons can be presented when they are relevant and where they are relevant based on the hover over zone and the location of the pointer icon.

More generally, floating action buttons are presented when a UI focus is targeting a hot zone. The UI focus can result from a key focus, a pointer focus (e.g., icon), and so forth. The hot zone can correspond to a hover over zone, a key indication zone, and so forth. This terminology is described further herein below with particular reference to FIG. 3A.

Example GUI Screenshot

Figure 1:
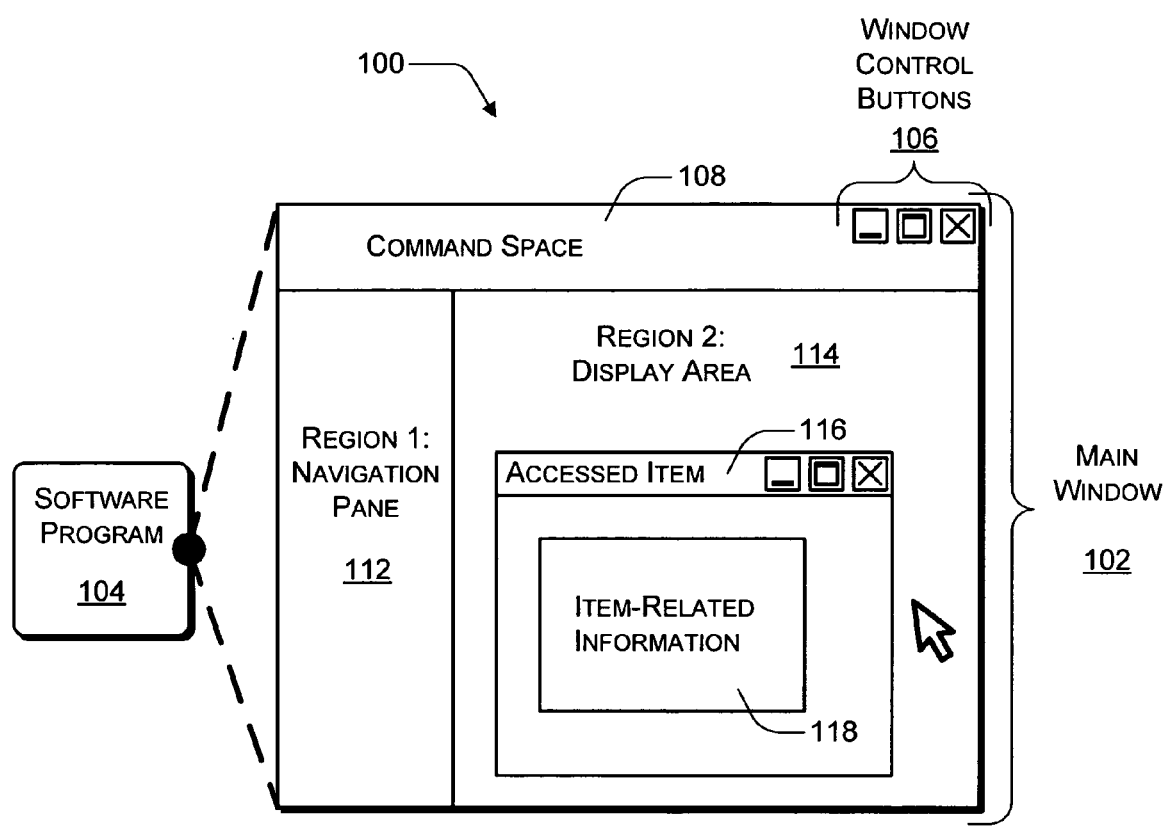
FIG. 1 is an example of a general screenshot for a software program having a graphical user interface (GUI) capability that includes a navigation mechanism.

FIG. 1 is an example of a general screenshot 100 for a software program 104 having a graphical user interface (GUI) capability that includes a navigation mechanism. In a described implementation, software program 104, as represented by its main window 102, is illustrated in a navigational or other mode in which an item (e.g., an entity, a file, an object, another data structure, etc.) can be accessed. A first region, or navigation pane 112, includes a listing of entries (not explicitly shown in FIG. 1). Each listed entry represents an item that can be accessed or otherwise interacted with through the navigational mechanism of software program 104.

In general screenshot 100, main window 102 of software program 104 includes a command space 108. Command space 108 may include a title bar, a menu area, and/or a tool bar, and so forth. Typically, a menu area offers drop-down menus, and a tool bar includes buttons that may be activated by a user to cause software program 104 to perform various actions as represented by the tool bar buttons. Command space 108 of main window 102 may also include standard window control buttons 106 (e.g., those buttons that are determined by an operating system on which software program 104 is running). As illustrated, window control buttons 106 include, from left to right, a minimization button, a maximization button, and a closing or termination button.

In the illustrated navigation or other item-interaction mode, main window 102 of software program 104 includes first region 112 that facilitates navigation. This first region comprises a pane or sub-window of main window 102. Navigation pane 112 includes a listing of entries (not explicitly shown in FIG. 1) with each entry empowering the user to interact with a represented item via a GUI as shown in general screenshot 100. Hence, the illustrated navigation pane 112 is an example of a navigation mechanism.

In a described navigational implementation, activation of an entry that is listed within navigation pane 112 causes some aspect of the item represented by the activated entry to be displayed in a second region 114 of main window 102. The second region is termed display area 114. As illustrated, item-related information 118 of the activated item is displayed within an accessed item sub-window 116. Item-related information 118 may be, for example, actual contents of the item (e.g., data of a database object, text of a word processing document, etc.), properties information about the item, a description of items that are related to the activated item, accessing or other history of the item, and so forth.

Although navigation pane 112 is illustrated as being displayed vertically, it may alternatively be organized horizontally or in another format. Furthermore, navigation pane 112 may alternatively be located at a different portion of main window 102 or in another window that is separate therefrom. Additional example interaction mechanisms, as well as example item-entry listings, are described herein below with particular reference to FIGS. 2A-6 in the section entitled "Floating Action Buttons".

Although floating action buttons are described herein primarily in terms of being part of a navigation mechanism of a navigation pane 112, floating action buttons are not so limited. For example, floating action buttons may be utilized in conjunction with software features besides navigation. Such other features include, but are not limited to, word processing features, spreadsheet features, gaming features, other artistic and/or entertainment program features, educational program features, and so forth. For instance, if a word processing program has enabled hover over zones, then locating a pointer over a table may precipitate the presentation of floating action buttons relevant to formatting a table. If a game program has enabled hover over zones, locating a pointer over a tangible object may cause floating action buttons to be presented that enable manipulation of the tangible object. As these examples indicate, floating action buttons may be utilized at any part of a general screen or main window and need not be limited to a particular region.

Although the accompanying figures and the description herein that references them may illustrate and pertain to specific implementations (e.g., in which a region actually is or appears to be represented specifically as a pane, a sub-window, or a separate window, or a portion thereof), it should be understood that graphical elements or regions can be alternatively implemented as a different one or more of a pane, a sub-window, a separate window, and so forth.

Floating Action Buttons

Figure 2A:
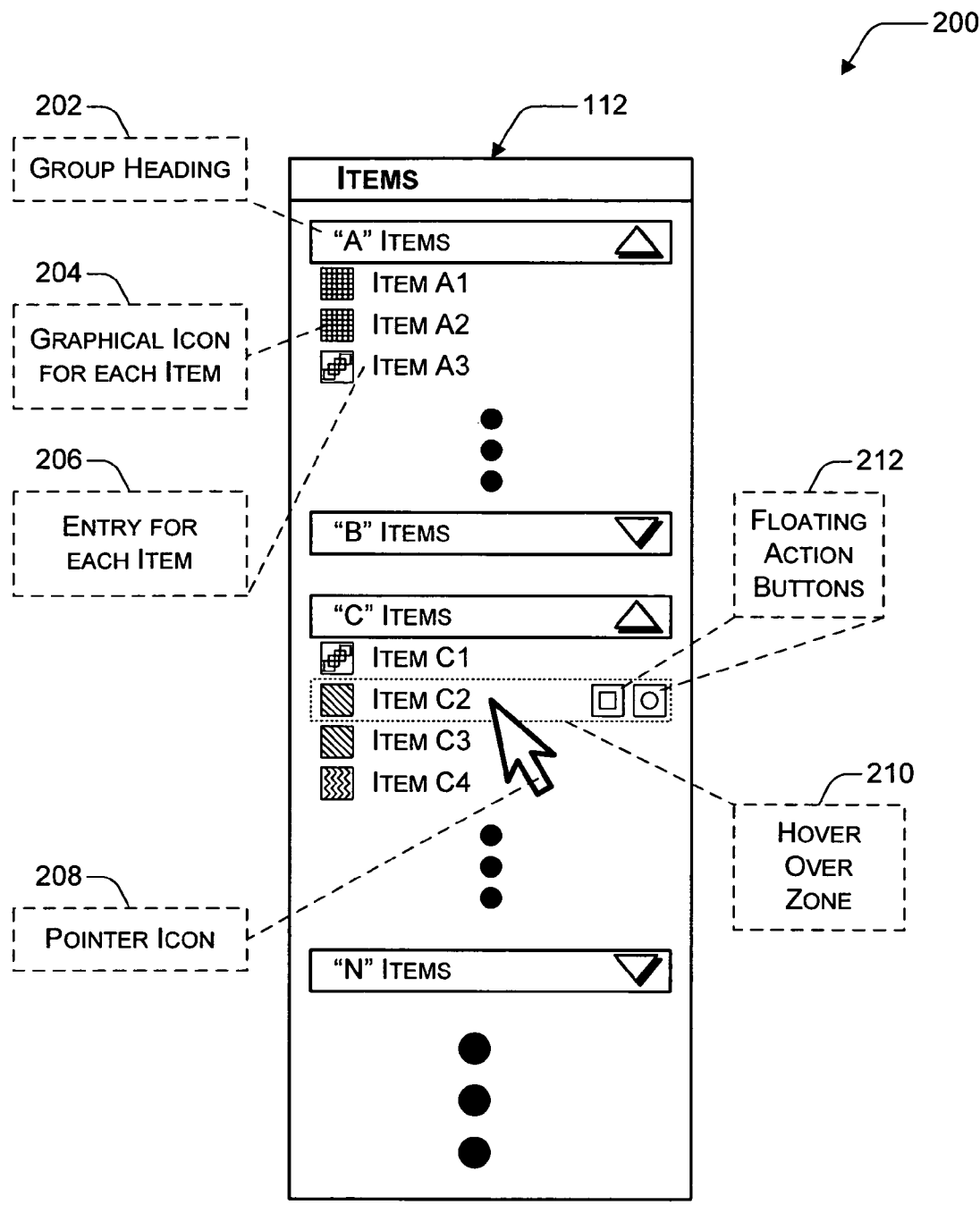
FIG. 2A is an example of floating action buttons being presented with regard to a hover over zone in a navigation environment.

FIG. 2A is an example of floating action buttons 212 being presented with regard to a hover over zone 210 in a navigation environment 200. Navigation environment 200 includes a navigation pane 112. Navigation pane 112 includes one or more lists of entries for items. In a described implementation, the items comprise database objects that are listed in groups. Alternatively, however, the items may comprise any software or logical construct, and navigation pane 112 may be organized in a manner other than a listing or a group of listings.

As illustrated, navigation pane 112 includes "N" groups of items. These "N" groups include the "A" items, the "B" items, the "C" items . . . the "N" items in a vertical listing from top to bottom. Navigation pane 112 may also include other, e.g., navigational-related features, icons, and/or information.

FIG. 2A includes six (6) explanatory annotations 202-212 that are indicated by rectangles formed from medium dashed lines. These annotations 202-212 are not usually actually displayed onscreen; however, they may be displayed (e.g., as a contextual help balloon popup or similar). Although not explicitly shown, navigation pane 112 may include window/sub-window and/or window pane type controls. For example, navigation pane 112 may include a horizontal and/or a vertical scroll bar; it may also include closing, minimizing, etc. buttons. Furthermore, navigation pane 112 may include a pane-style sliding mechanism for changing the width (and/or height) of the visible pane portion.

As illustrated in FIG. 2A at annotation 202, each group of items is listed under a group heading 202. Each group heading 202 includes a collapsing icon or an expansion icon. The "A" and "C" groups have items thereof displayed, so their group headings 202 include a collapsing icon that can be activated to hide their items. The "B" and "N" groups do not have any of their items displayed, so their group headings 202 include an expansion icon that can be activated to reveal their items.

As indicated at annotation 206, each item that is displayed has a corresponding item entry 206 under its associated group heading 202. Items may be associated with groups in a variety of manners and for a variety of reasons. Each item may be associated with more than one group. Items may also be associated with a miscellaneous or an un-assigned group. By way of example only, groups may be separated or segmented by item type, item functionality, item creator, item relationship, and so forth. The grouping may optionally be user-selectable. In an example database implementation, the "A" Items group may be for tables, the "B" Items group may be for queries, the "C" Items group may be for reports, and so forth.

As indicated at annotation 204, a graphical item icon 204 is included as part of the displayed entry listing for each item. In an example implementation, there is a respective type of item icon 204 corresponding to each respective type of item. As indicated at annotation 208, an example pointer icon 208 is also displayed. The example pointer icon 208 comprises an arrow in navigation environment 200, but pointer icons may be realized in other shapes.

As indicated at annotation 210, a hover over zone exists around the entry for "Item C2". Hover over zone 210 is indicated by the short dashed lines forming the rectangle around the entry for "Item C2". These short dashed lines are not usually actually displayed onscreen. However, the short dashed lines or another highlighting technique (e.g., inverse video, color change, luminosity change, etc.) may be implemented when a pointer icon 208 enters and thereby engages a hover over zone 210.

As indicated at annotation 212, one or more floating action buttons 212 are presented proximate to pointer icon 208 and/or hover over zone 210. In operation, a UI component establishes a hover over zone 210 proximate to (e.g., fully or partially around) a UI element of interest. A UI component is described further herein below with particular reference to FIG. 5.

As illustrated, the UI element of interest is each listed item entry 206. When a pointer icon 208 enters hover over zone 210, hover over zone 210 is engaged and floating action buttons 212 are presented. Floating action buttons 212 may be presented (e.g., displayed) fully or partially within hover over zone 210, or floating action buttons 212 may be presented (e.g., displayed) outside of hover over zone 210.

Different types of action buttons may be implemented as floating action buttons 212. For example, floating action buttons 212 may be realized as (i) action buttons that provide a single predetermined action when activated, (ii) so-called split action buttons that can provide a single predetermined "primary" action when a first portion is activated or can produce a pop-up menu with action options when an arrow or similar second portion of the action button is activated, (iii) some other toolbar button metaphor, (iv) some combination thereof, (iv) and so forth.

In order to provide convenience to the user, floating action buttons 212 are presented relatively close to pointer icon 208. This can typically be accomplished by displaying floating action buttons 212 at least partially within hover over zone 210. In fact, in a described implementation and as illustrated in FIG. 2A, floating action buttons 212 are displayed within the associated hover over zone 210. If a portion of the text of item entry 206 is obscured by floating action buttons 212, ellipses can be added and/or the complete text of item entry 206 can be displayed in a bubble above or below hover over zone 210 and/or floating action buttons 212 (or otherwise proximate to item entry 206).

In a described implementation, floating action buttons 212 are presented onscreen so long as pointer icon 208 remains within hover over zone 210. When pointer icon 208 is moved outside of hover over zone 210, floating action buttons 212 are removed from the screen. While floating action buttons 212 are displayed, pointer icon 208 can be moved by the user to an action button of floating action buttons 212. Activation of an action button from among the one or more floating action buttons 212 causes an action corresponding to the activated action button to be implemented. This process is described further herein below with particular reference to FIG. 6.

Figure 2B:
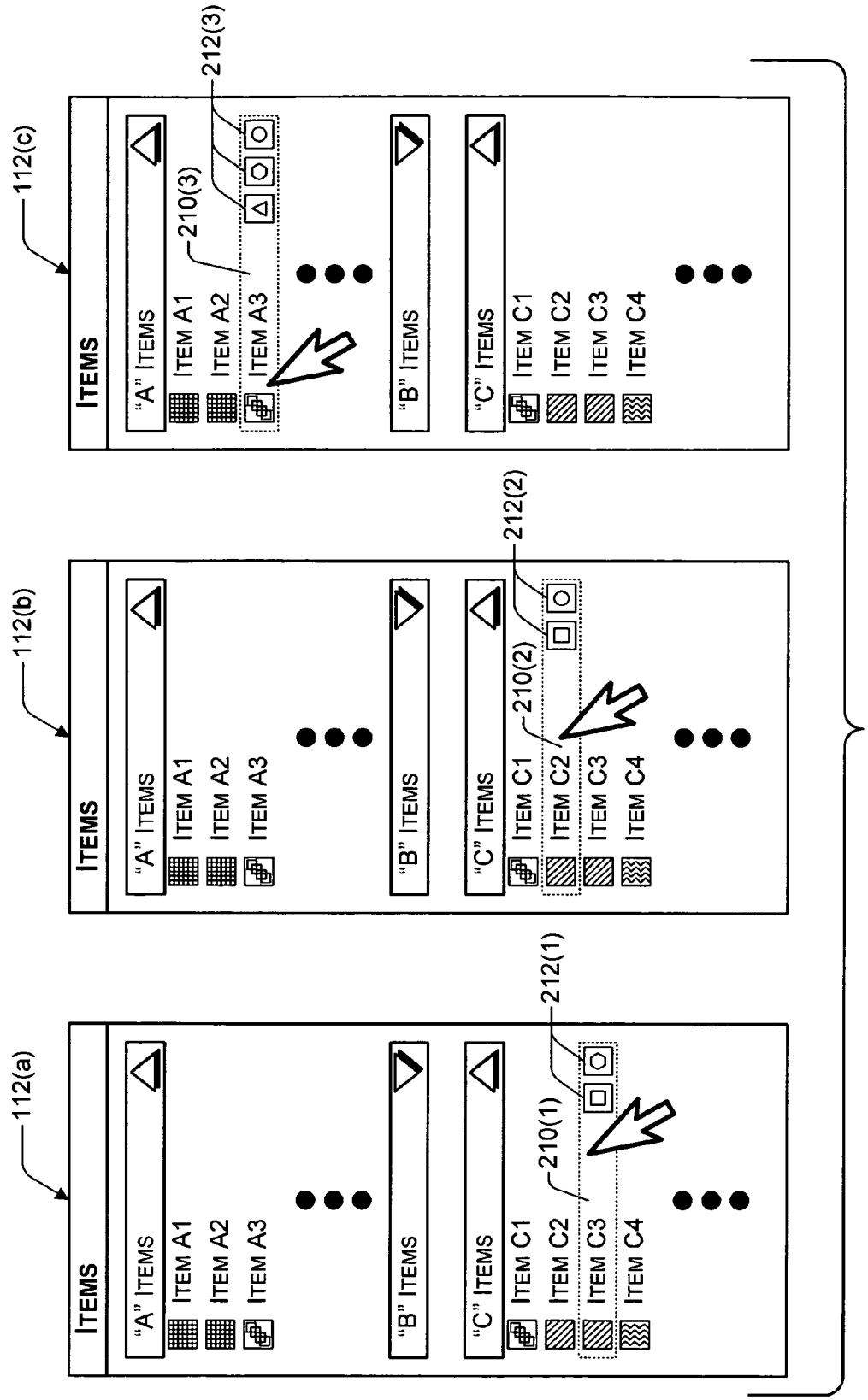
FIG. 2B is an example of different sets of floating action buttons being presented with regard to different hover over zones in the navigation environment.

FIG. 2B is an example of different sets of floating action buttons 212(1,2,3) being presented with regard to respective different hover over zones 210(1,2,3) in a navigation environment having a navigation pane 112 in three different respective conditions (a,b,c). Each navigation pane condition 112 (a,b,c) illustrates navigation pane 112 at a different respective time when pointer icon 208 (not explicitly designated in FIG. 2B to avoid cluttering the UI) is located in a different respective hover over zone 210(1,2,3).

It should be understood that hover over zones 210 are established by the UI when the UI is displayed. In other words, although only one hover over zone 210(1) is specifically indicated in navigation pane 112(a), each item entry 206 has an associated hover over zone 210 that is established for it. A given hover over zone 210 becomes engaged when pointer icon 208 is located within the given hover over zone 210. Optionally, in addition to the presentation of associated floating action buttons 212, the appearance of an engaged hover over zone 210 may be changed (e.g., with inverse video, with a brightening or darkening, with expansion of the associated item entry 206, with some other highlighting, etc.).

Navigation pane 112(a) is in a first condition when pointer icon 208 is located within hover over zone 210(1). When the user locates pointer icon 208 within hover over zone 210(1), the floating action buttons 212(1) that are associated therewith are presented. For the item entry 206 of "Item C3", there are two associated floating action buttons 212(1). By way of example only, floating action buttons 212(1) include a "square" action button and a "hexagon" action button.

Navigation pane 112(b) is in a second condition when pointer icon 208 is located within hover over zone 210(2). When the user locates pointer icon 208 within hover over zone 210(2), the floating action buttons 212(2) that are associated therewith are presented. For the item entry 206 of "Item C2", there are two associated floating action buttons 212(2). By way of example only, floating action buttons 212(2) include a "square" action button and a "circle" action button.

Navigation pane 112(c) is in a third condition when pointer icon 208 is located within hover over zone 210(3). When the user locates pointer icon 208 within hover over zone 210(3), the floating action buttons 212(3) that are associated therewith are presented. For the item entry 206 of "Item A3", there are three associated floating action buttons 212(3). By way of example only, floating action buttons 212(3) include a "triangle" action button, a "hexagon" action button, and a "circle" action button.

As is apparent from the UI examples of FIG. 2B, a given set of floating action buttons 212 are removed from the display screen when pointer icon 208 ceases to be located within the associated hover over zone 210. Additionally, it is apparent that each set of floating action buttons 212 may have a different total number of action buttons. Also, the action buttons of each set of floating action buttons 212 may provide differing features. Both of these differences may exist within a single group of items as well as between two or more groups of items.

Figure 3A:
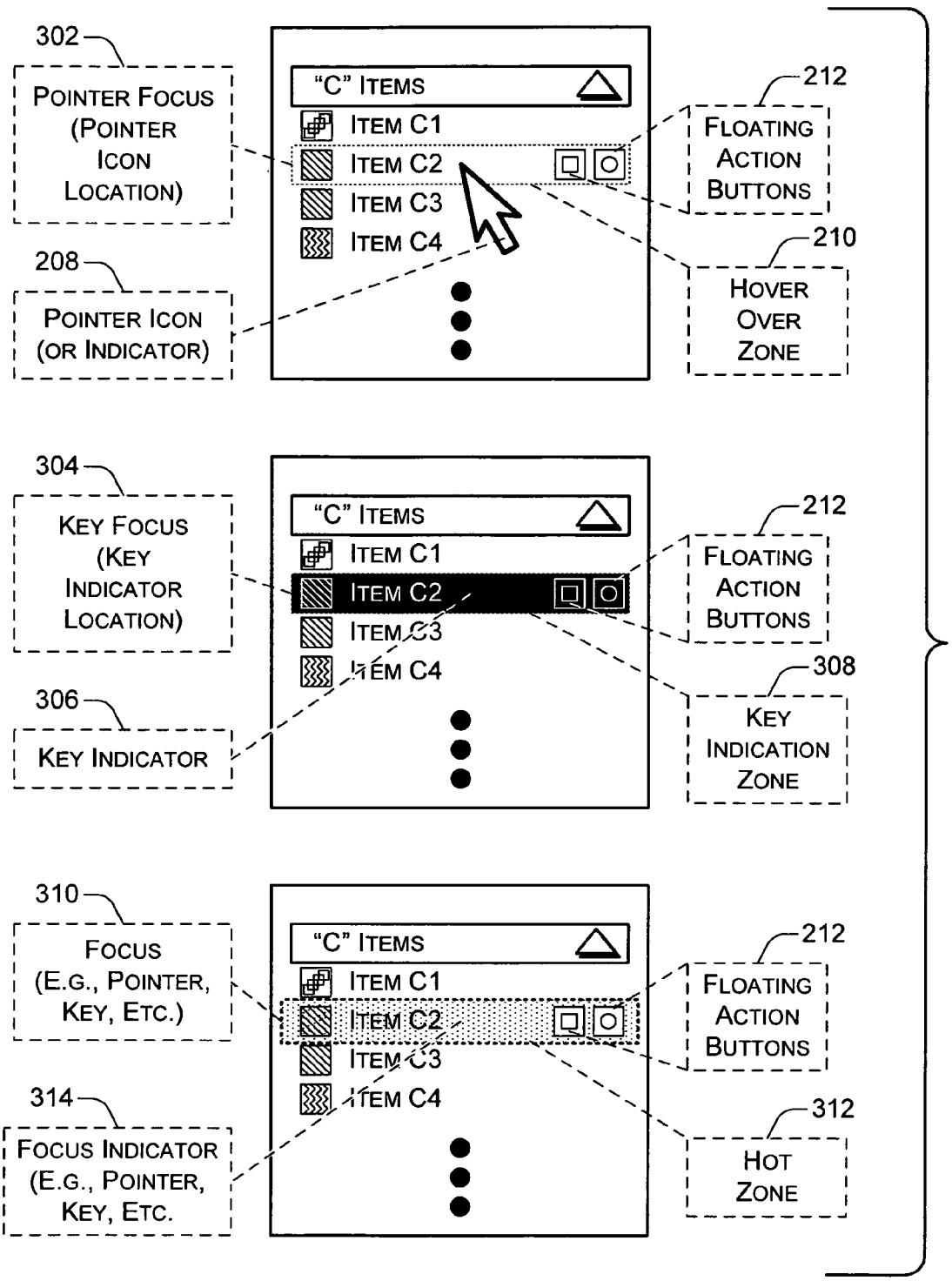
FIG. 3A is an example of floating action buttons being presented with regard to a hover over zone, a key indication zone, and a more general hot zone.

FIG. 3A is an example of floating action buttons 212 being presented with regard to a hover over zone 210, a key indication zone 308, and a more general hot zone 312. Seven (7) new annotations 302-314 are illustrated in FIG. 3A. Hover over zone 210 is depicted at the top of FIG. 3A, key indication zone 308 is depicted in the middle, and hot zone 312 is depicted at the bottom.

As described herein above, locating pointer icon or indicator 208 within hover over zone 210 engages hover over zone 210 and precipitates the presentation of floating action buttons 212. Annotation 302 shows that the location of pointer icon 208 denotes a pointer focus 302. Hence, when pointer focus 302 targets hover over zone 210, the presentation of floating action buttons 212 is triggered.

Although user interaction with a program via a GUI is often dominated by a pointer icon (at least with respect to icons and other graphical elements), user interaction with a program via a GUI can usually also be accomplished with keyboard commands. For example, a key focus can be maneuvered around a GUI with the "Tab" key, with cursor arrow keys, and so forth. Once a key focus has been maneuvered such that it is targeting a desired key indication zone, the UI element corresponding to the key indication zone can be activated with the "Enter" key.

Thus, floating action buttons 212 can also be implemented when a user is interacting with the UI of software program 104 with keyboard commands. Annotation 306 shows a key indicator. Annotation 304 shows that the location of key indicator 306 denotes a key focus 304. Consequently, locating key indicator 306 at key indication zone 308 engages key indication zone 308 and precipitates the presentation of floating action buttons 212. Hence, when key focus 304 targets key indication zone 308, the presentation of floating action buttons 212 is triggered.

Key indicators 306 can be displayed in any manner. Generally, a key indicator is a way to highlight a UI element. Examples of key indicator 306 highlighting include (i) an encircling (with a solid or dashed line) of a UI element; (ii) a changing of a foreground, background, textual, etc. color of a UI element; (iii) a darkening or brightening of a UI element; (iv) a changing of the size of a UI element; (v) an expansion of the textual content of a UI element; (vi) an underlining or bolding of (especially a textual portion of) a UI element; (vii) applying a graphical halo effect to a UI element; (viii) inverse video (which is the illustrated example); (ix) some combination thereof; and (x) so forth. It should be noted that such highlighting may be applied to all or a portion of a UI element.

A key indicator 306 may be maneuvered and/or activated in any of many possible manners. For example, a key indicator 306 may be maneuvered with arrow keys, with a tab key, with any other key, or with a key combination. After one or more floating action buttons 212 have been presented, a key indicator 306 can also be maneuvered so as to highlight an action button of the one or more floating action buttons 212. The highlighted action button can also be selected by pressing a key (e.g., the enter key) or a key combination.

To review both pointer-oriented and key-oriented approaches, key indication zone 308 is analogous to hover over zone 210. Key focus 304 is analogous to pointer focus 302, and key indicator 306 is analogous to pointer icon or indicator 208. In this manner, floating action buttons 212 can be presented when a pointer icon 208 is located within a hover over zone 210. More generally, floating action buttons 212 can be presented when a pointer focus 302 targets a hover over zone 210. Similarly, floating action buttons 212 can be presented when a key indicator 306 is located at a key indication zone 308. More generally, floating action buttons 212 can be presented when a key focus 304 targets a key indication zone 308.

The separate terminologies for the pointer-oriented approach and for the key-oriented approach can be generalized so as to encompass both of these as well as other approaches to interacting with programs via GUIs. Annotation 314 shows that the location of a focus indicator 314 denotes a focus 310. Thus, floating action buttons 212 can be presented when focus indicator 314 is located at a hot zone 312.

More generally, floating action buttons 212 can be presented when focus 310 targets a hot zone 312. Focus 310 may be a pointer focus 302, a key focus 304, some other focus type, and so forth. Focus indicator 314 may be a pointer indicator (e.g., icon) 208, a key indicator 306, some other indicator type, and so forth. Hot zone 312 may be a hover over zone 210, a key indication zone 308, some other zone type, and so forth. In other words, any user input device can be used to maneuver a focus indicator 314 and to activate floating action buttons 212. Regardless, presentation of floating action buttons 212 is triggered when a focus 310 targets a hot zone 312.

Figure 3B:
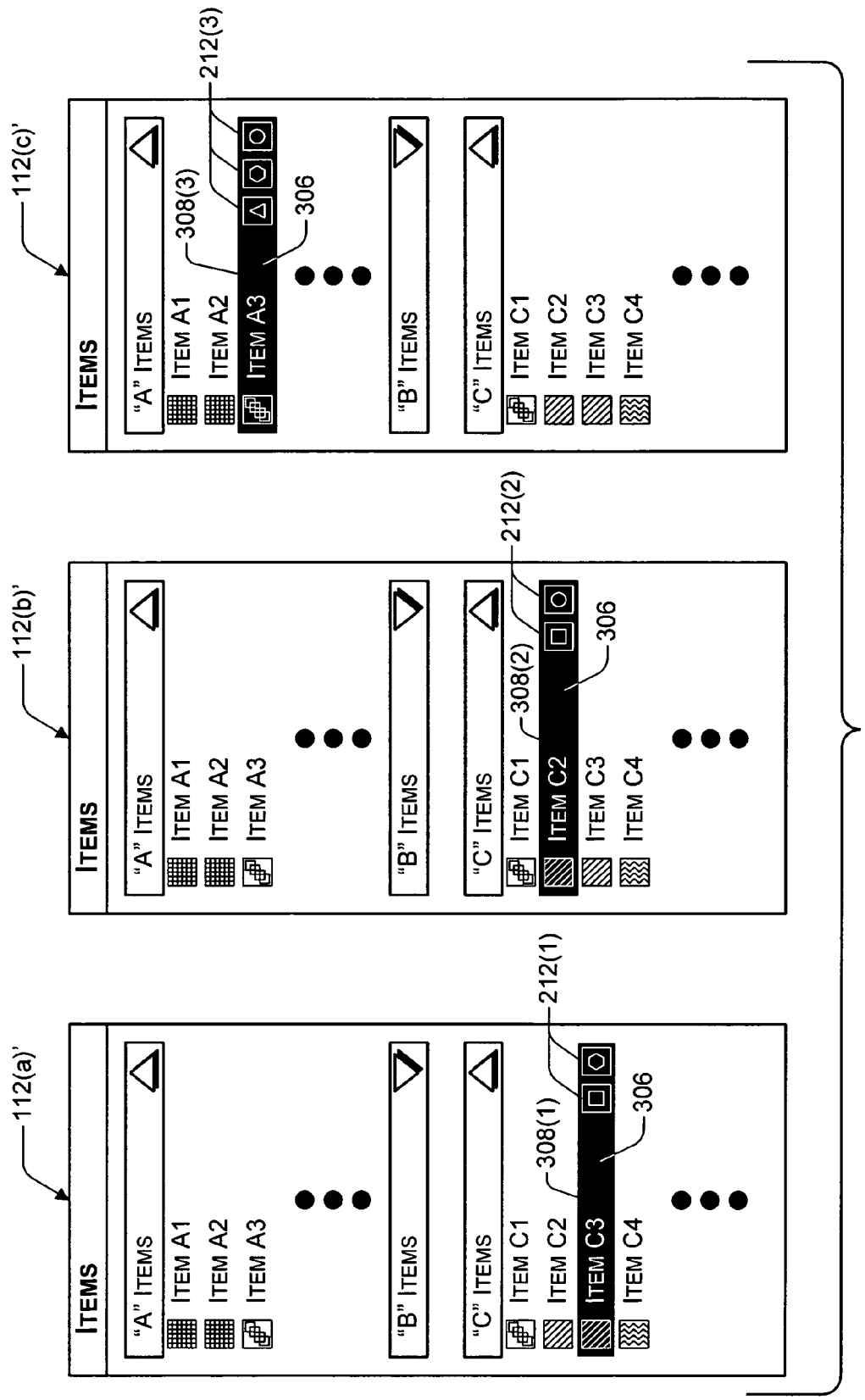
FIG. 3B is an example of different sets of floating action buttons being presented with regard to different key indication zones in the navigation environment.

FIG. 3B is an example of different sets of floating action buttons 212(1,2,3) being presented with regard to respective different key indication zones 308(1,2,3) in a navigation environment having a navigation pane 112 in three different respective conditions (a,b,c)'. Each navigation pane condition 112(a,b,c)' illustrates navigation pane 112 at a different respective time when key indicator 306 is located in a different respective key indication zone 308(1,2,3).

Navigation pane 112(a)' is in a first condition when key indicator 306 is located at key indication zone 308(1). When the user locates key indicator 306 at key indication zone 308(1), the floating action buttons 212(1) that are associated therewith are presented. Navigation pane 112(b)' is in a second condition when a user moves key indicator 306 (e.g., with an up arrow key) such that it is located at key indication zone 308(2). When the user locates key indicator 306 at key indication zone 308(2), the floating action buttons 212(2) that are associated therewith are presented. Navigation pane 112(c)' is in a third condition when key indicator 306 is located at key indication zone 308(3). When the user locates key indicator 306 at key indication zone 308(3), the floating action buttons 212(3) that are associated therewith are presented.

Figure 4:
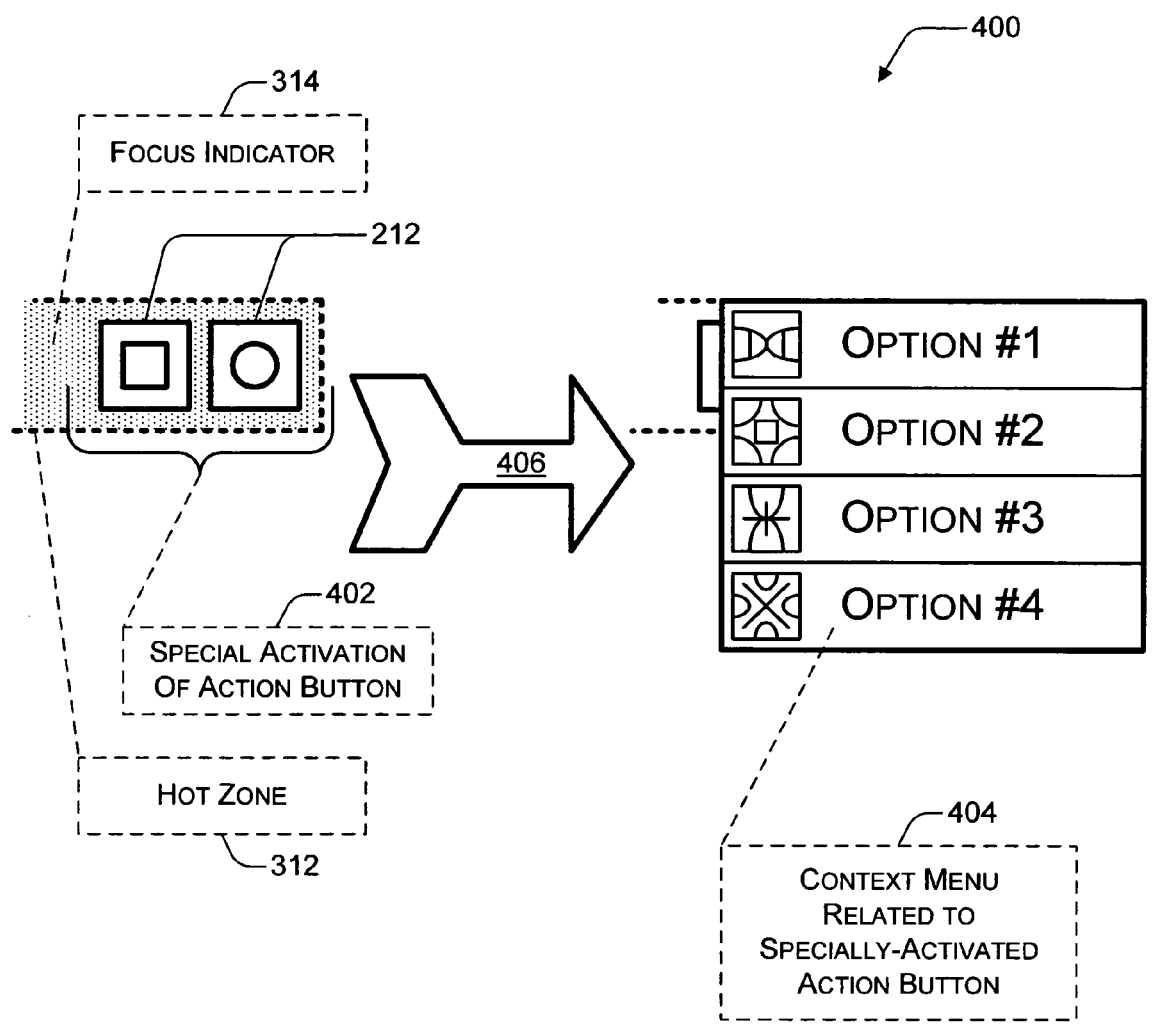
FIG. 4 is an example of a context menu being presented responsive to a special activation of a floating action button.

FIG. 4 is an example 400 of a context menu 404 being presented responsive to a special activation of a floating action button 212. A hot zone 312 is displayed as being engaged by the presence of a focus indicator 314 thereat. The hot zone 312 illustrated in example 400 includes at least two floating action buttons 212. FIG. 4 also includes two (2) annotations 402-404.

In a described implementation, floating action buttons 212 are activated with a standard activation mechanism or procedure. For example, a user employing a mouse to maneuver a pointer icon 208 implementation of a focus indicator 314 may left-click the mouse. However, floating action buttons 212 may also be activated with a non-standard or special activation mechanism or procedure. For example, a user employing a mouse to maneuver a pointer icon 208 may right-click the mouse.

At annotation 402, a special (e.g., right-click) activation procedure is occurring on an action button of floating action buttons 212. When manipulating a GUI with a key-oriented approach, a special activation 402 may be enabled or accomplished with, for example, the "Alt" key, a function key, a "Shift+Enter" keyboard combination, any other key or key combination that is so designated, and so forth. With a pointer-oriented approach, instead of or in addition to right-clicking, a special activation 402 may be enabled or accomplished with, for example, clicking a third or other special mouse button, simultaneously pressing a key and a mouse button, and so forth. Regardless, the special activation 402 of a particular floating action button 212, as indicated by arrow 406, precipitates the presentation of a context menu 404.

At annotation 404, a context menu that is related to the specially-activated action button 212 is shown. Context menu 404 includes one or more options (options #1-#4 as shown) that can be selected by the user. The one or more options of context menu 404 are made available with regard to the feature provided by the particular specially-activated action button 212 and/or with respect to an item corresponding to the item entry 206 that is associated with the engaged hot zone 312. Optionally, and as illustrated, each option of context menu 404 may be displayed with an icon that indicates the underlying property or ability of the option.

Figure 5:
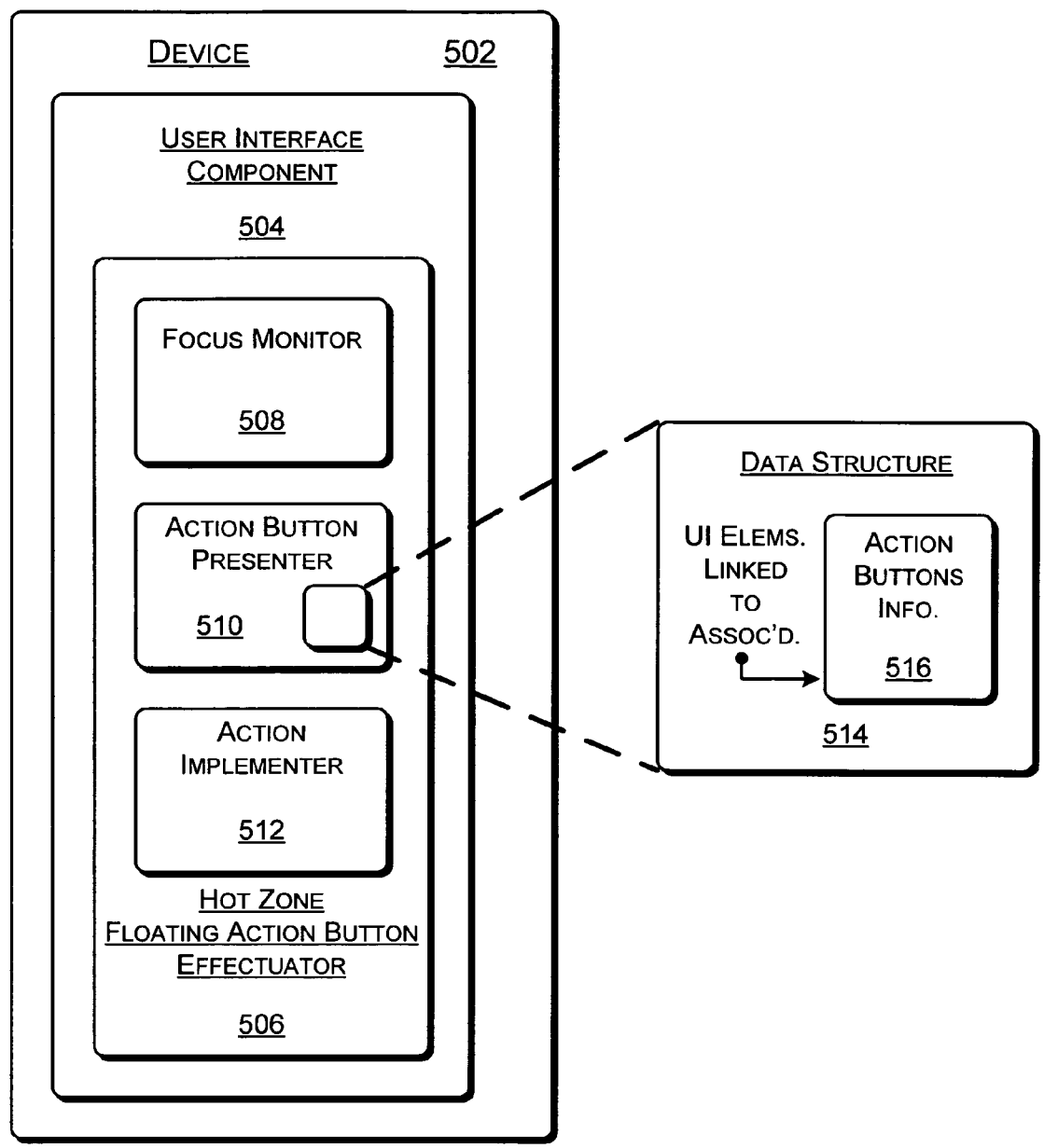
FIG. 5 is a block diagram of a user interface component having an example hot zone floating action button effectuator.

FIG. 5 is a block diagram of a user interface component 504 having an example hot zone floating action button effectuator 506. A device 502 is illustrated in FIG. 5. Device 502 may comprise a personal computer (PC), a personal digital assistant (PDA), a game machine, and so forth. Other examples of a device 502, as well as processor, media, component, etc.

aspects of an example general device, are described herein below with particular reference to FIG. 7 in a section entitled "Example Operating Environment for Computer or Other Device".

In a described implementation, user interface component 504 is capable of establishing a UI with and for device 502. An example of a UI is a graphical UI (GUI) that includes icons and a pointing element for manipulating the icons and/or for utilizing features of the GUI. User interface component 504 can also produce a UI (including a GUI) that enables manipulation of icons and/or utilization of features with a keyboard or other user input device. Hot zone floating action button effectuator 506 effectuates one or more implementations of the hot zone and floating action button schemes, mechanisms, and techniques that are described herein.

Hot zone floating action button effectuator 506 establishes hot zones 312 proximate to selected UI elements of interest, such as icons, text, entries, and so forth. As illustrated, hot zone floating action button effectuator 506 includes a focus monitor 508, an action button presenter 510, and an action implementer 512. Focus monitor 508 monitors a location of a focus indicator 314 to determine if/when the monitored focus indicator 314 enters or otherwise becomes located at a hot zone 312.

After a focus indicator 314 is determined to have entered a particular hot zone 312 by focus monitor 508, action button presenter 510 presents floating action buttons 212 that are associated with the particular hot zone 312. Action button presenter 510 includes or otherwise has access to a data structure 514 that maps UI elements (e.g., listed icon entries 206) to floating action buttons 212 as described in action buttons information 516.

Action buttons information 516 includes a description of each UI icon and represented action that correspond to a given action button. Hence, mapping data structure 514 links respective UI elements of interest to associated respective floating action buttons, with each action button corresponding to an action and a UI icon that is described by action buttons information 516. Consequently, action button presenter 510 can ascertain at least one action button 212 that is associated with a particular hot zone 312 that is engaged as a result of focus indicator 314 being located at the particular hot zone 312. Action button presenter 510 also causes the ascertained at least one action button 212 to be displayed in relation to the UI element of interest.

After floating action buttons 212 are presented by action button presenter 510, standard user activation of one of the presented floating action buttons 212 results in the corresponding action being implemented by action implementer 512. Such actions may include, but are not limited to, accessing an item corresponding to a UI element, (re)formatting the item, moving or grouping the item, running the item, previewing the item, and so forth.

Figure 6:
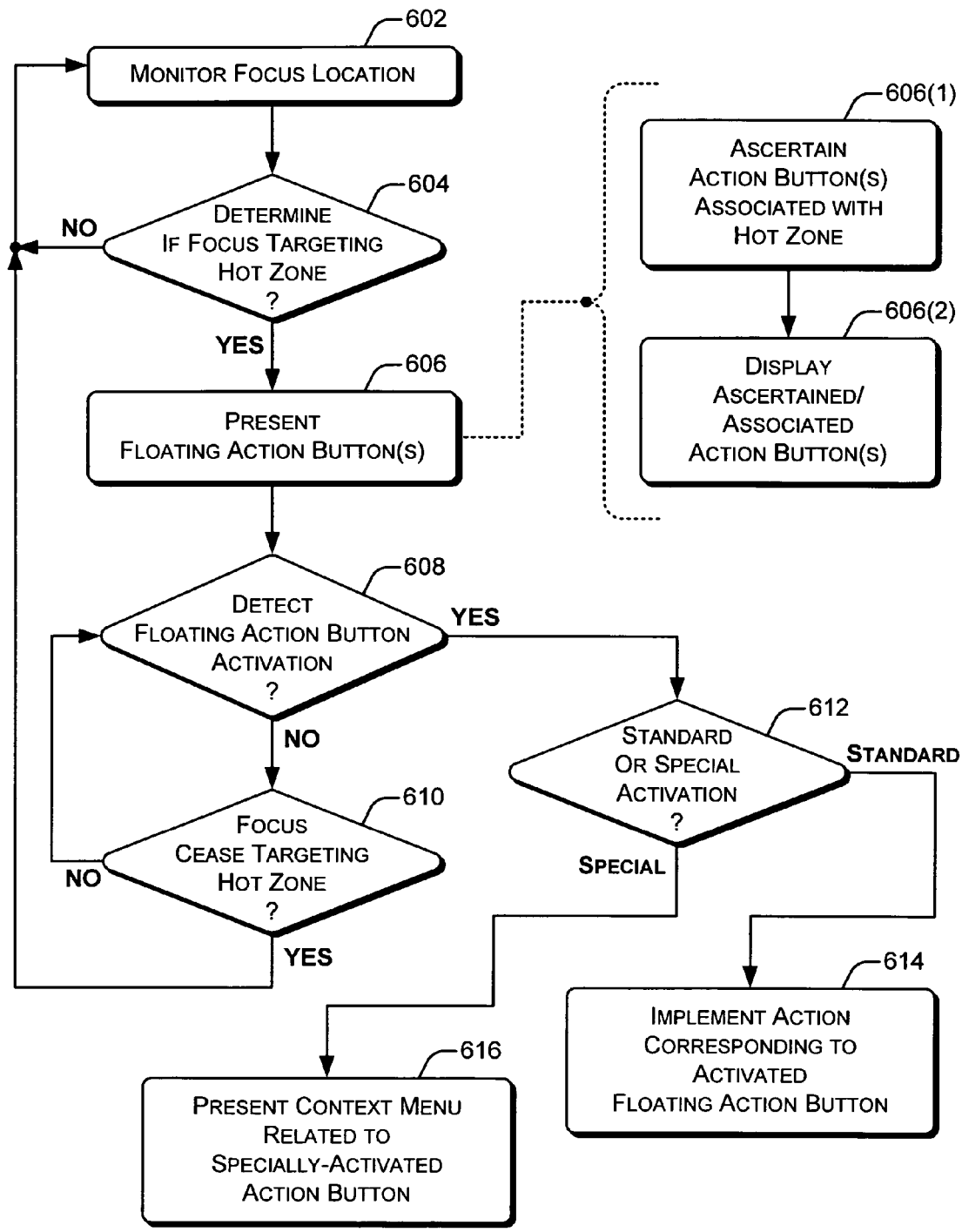
FIG. 6 is a flow diagram that illustrates an example of a method for providing software features using floating action buttons.

FIG. 6 is a flow diagram 600 that illustrates an example of a method for providing software features using floating action buttons. Flow diagram 600 includes eight (8) primary blocks 602-616 and two (2) secondary blocks 606(1) and 606(2). Although the actions of flow diagram 600 may be performed in other environments and with a variety of hardware and software combinations, FIGS. 1-5 are used in particular to illustrate certain aspects and examples of the method. By way of example only, the actions of flow diagram 600 may be performed by a software program 104 comprising a database program that provides access to a database having items that comprise database objects.

At block 602, a focus location is monitored. For example, the location of focus indicator 314 may be monitored by focus monitor 508. At block 604, it is determined if the focus is targeting a hot zone. For example, focus monitor 508 may determine if focus 310 is targeting hot zone 312. For instance, it may be determined if focus indicator 314 is located at hot zone 312. If not, then focus location monitoring is continued at block 602.

If, on the other hand, it is determined (at block 604) that the focus is targeting a hot zone (e.g., that the location of the focus indicator is at a hot zone), then at block 606 one or more floating action buttons are presented. For example, floating action buttons 212 may be presented in relation to a UI element (e.g., an item entry 206) that is associated with hot zone 312.

The actions of blocks 606(1) and 606(2) illustrate an example implementation of the action(s) of block 606. At block 606(1), the action button(s) that are associated with the hot zone are ascertained. For example, using action buttons information 516 of data structure 514, action button presenter 510 may ascertain those action button(s) that are associated with the hot zone 312 that has been engaged by the presence of focus indicator 314 thereat. The mappings of data structure 514 may initially be set based on context, subject-matter, etc. between an item corresponding to the UI element associated with hot zone 312 and the actions that apply to that item.

At block 606(2), the ascertained associated action button (s) are displayed. For example, floating action buttons 212 may be displayed on a display screen (e.g., as part of a navigation pane 112). Floating action buttons 212 may be displayed to fully or partially overlap hot zone 312. Alternatively, they may be displayed so that they do not overlap at all.

At block 608, it is determined if a presented floating action button has been detected to be activated. For example, it may be detected whether a floating action button 212 has been activated. If so, then at block 612 the activation is identified as being a standard activation or a special activation. If the floating action button is activated through a standard activation mechanism, then at block 614 an action corresponding to the activated floating action button is implemented. For example, action implementer 512 may implement an action corresponding to a floating action button 212 that has been detected to be activated with a standard mechanism.

If, on the other hand, a non-standard or special activation of a floating action button 212 is identified (at block 612), then at block 616 a context menu that is related to the specially-activated action button is presented. For example, upon special activation 402 of an action button 212, display of a context menu 404 may be precipitated.

If, on the other hand, activation of a floating action button is not detected (at block 608), then at block 610 it is checked if the focus has ceased targeting the hot zone (e.g., it is checked if the focus indicator has been moved outside the hot zone). For example, it may be checked if focus 310 has ceased targeting hot zone 312. For instance, it may be checked if focus indicator 314 has ceased to be at hot zone 312. If the focus has not ceased targeting the hot zone, then the floating-action-button activation-detecting is repeated at block 608. If, on the other hand, the focus has ceased targeting the hot zone (as checked at block 610), then the focus location monitoring continues at block 602. Also, the currently-presented floating action buttons may optionally be removed from the UI (e.g., they may be deleted or erased from the display screen) after the focus ceases targeting the current hot zone.

The devices, actions, aspects, features, screen displays, procedures, modules, components, etc. of FIGS. 1-6 are illustrated in diagrams that are divided into multiple blocks. However, the order, interconnections, interrelationships, layout, etc. in which FIGS. 1-6 are described and/or shown is not intended to be construed as a limitation, and any number of the blocks can be modified, combined, rearranged, augmented, omitted, etc. in any manner to implement one or more systems, methods, devices, procedures, media, apparatuses, arrangements, etc. for floating action buttons. Furthermore, although the description herein includes references to specific implementations (including a general device of FIG. 7), the illustrated and/or described implementations can be implemented in any suitable hardware, software, firmware, or combination thereof and using any suitable pointer icon(s), application or operating system program(s), GUI(s), data item type(s), standard and non-standard activation mechanism(s), action button format(s), and so forth.

Example Operating Environment for Computer or Other Device

Figure 7:
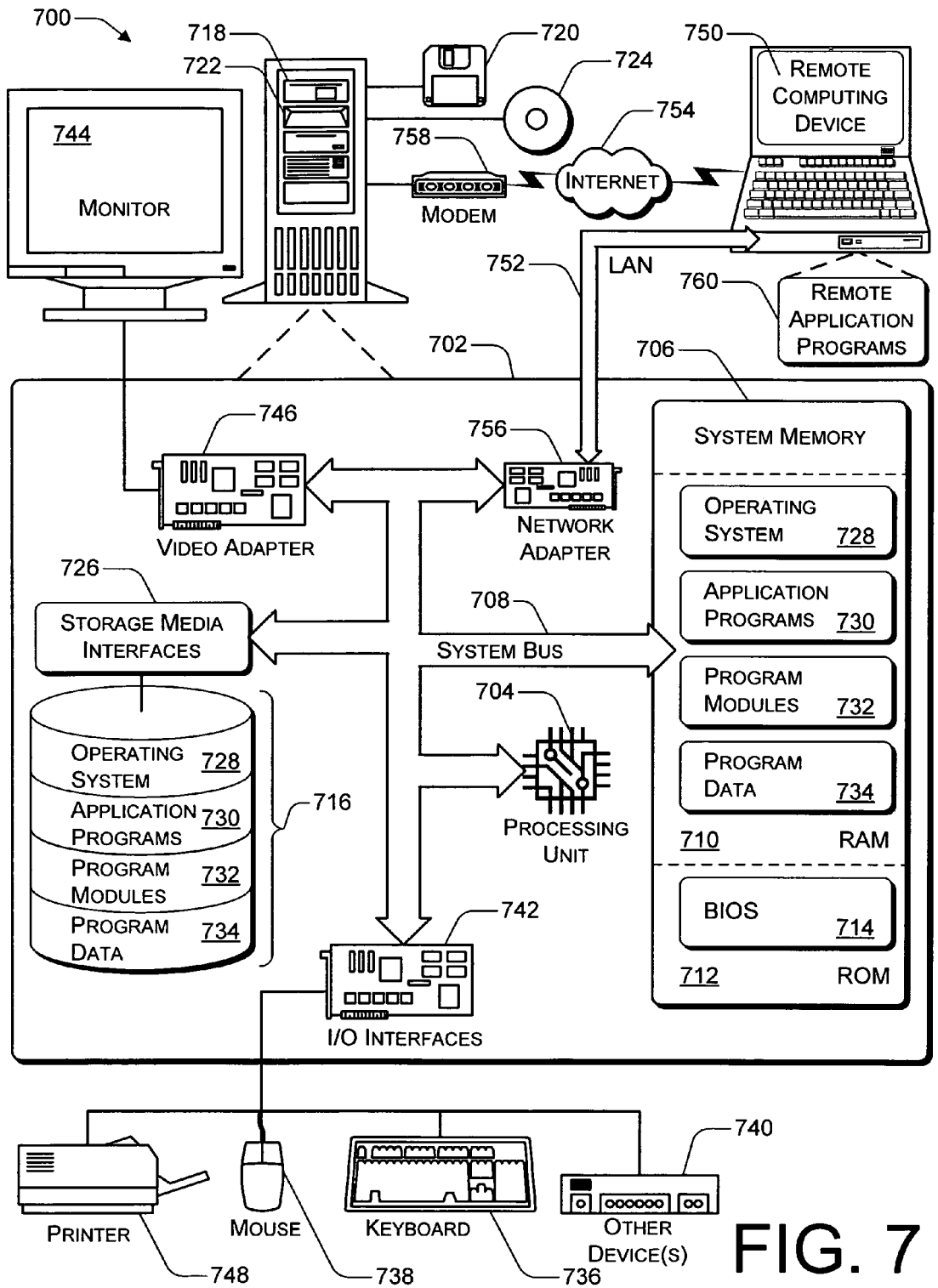
FIG. 7 illustrates an example of a computing (or general device) operating environment that is capable of (wholly or partially) implementing at least one aspect of floating action buttons as described herein.

FIG. 7 illustrates an example computing (or general device) operating environment 700 that is capable of (fully or partially) implementing at least one system, device, apparatus, component, arrangement, protocol, approach, method, procedure, media, API, some combination thereof, etc. for floating action buttons as described herein. Operating environment 700 may be utilized in the computer and network architectures described below.

Example operating environment 700 is only one example of an environment and is not intended to suggest any limitation as to the scope of use or functionality of the applicable device (including computer, network node, entertainment device, mobile appliance, general electronic device, etc.) architectures. Neither should operating environment 700 (or the devices thereof) be interpreted as having any dependency or requirement relating to any one or to any combination of components as illustrated in FIG. 7.

Additionally, implementations for floating action buttons may be realized with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations of floating action buttons may be described in the general context of processor-executable instructions. Generally, processor-executable instructions include routines, programs, protocols, objects, interfaces, components, data structures, etc. that perform and/or enable particular tasks and/or implement particular abstract data types. Floating action button realizations, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 700 includes a general-purpose computing device in the form of a computer 702, which may comprise any (e.g., electronic) device with computing/processing capabilities. The components of computer 702 may include, but are not limited to, one or more processors or processing units 704, a system memory 706, and a system bus 708 that couples various system components including processor 704 to system memory 706.

Processors 704 are not limited by the materials from which they are formed or the processing mechanisms employed therein. For example, processors 704 may be comprised of semiconductor(s) and/or transistors (e.g., electronic integrated circuits (ICs)). In such a context, processor-executable instructions may be electronically-executable instructions. Alternatively, the mechanisms of or for processors 704, and thus of or for computer 702, may include, but are not limited to, quantum computing, optical computing, mechanical computing (e.g., using nanotechnology), and so forth.

System bus 708 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 702 typically includes a variety of processor-accessible media. Such media may be any available media that is accessible by computer 702 or another (e.g., electronic) device, and it includes both volatile and non-volatile media, removable and non-removable media, and storage and transmission media.

System memory 706 includes processor-accessible storage media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is typically stored in ROM 712. RAM 710 typically contains data and/or program modules/instructions that are immediately accessible to and/or being presently operated on by processing unit 704.

Computer 702 may also include other removable/non-removable and/or volatile/non-volatile storage media. By way of example, FIG. 7 illustrates a hard disk drive or disk drive array 716 for reading from and writing to a (typically) non-removable, non-volatile magnetic media (not separately shown); a magnetic disk drive 718 for reading from and writing to a (typically) removable, non-volatile magnetic disk 720 (e.g., a "floppy disk"); and an optical disk drive 722 for reading from and/or writing to a (typically) removable, non-volatile optical disk 724 such as a CD, DVD, or other optical media. Hard disk drive 716, magnetic disk drive 718, and optical disk drive 722 are each connected to system bus 708 by one or more storage media interfaces 726. Alternatively, hard disk drive 716, magnetic disk drive 718, and optical disk drive 722 may be connected to system bus 708 by one or more other separate or combined interfaces (not shown).

The disk drives and their associated processor-accessible media provide non-volatile storage of processor-executable instructions, such as data structures, program modules, and other data for computer 702. Although example computer 702 illustrates a hard disk 716, a removable magnetic disk 720, and a removable optical disk 724, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 700.

Any number of program modules (or other units or sets of processor-executable instructions) may be stored on hard disk 716, magnetic disk 720, optical disk 724, ROM 712, and/or RAM 710, including by way of general example, an operating system 728, one or more application programs 730, other program modules 732, and program data 734. These processor-executable instructions may include, for example, one or more of: a software program having a navigation pane, a UI component or portion thereof, a data structure mapping UI elements to associated action buttons, a hot zone floating action button effectuator 506, and so forth.

A user may enter commands and/or information into computer 702 via input devices such as a keyboard 736 and a pointing device 738 (e.g., a "mouse"). Other input devices 740 (not shown specifically) may include a microphone, joystick, game pad, satellite dish, serial port, video camera, scanner, and/or the like. These and other input devices are connected to processing unit 704 via input/output interfaces 742 that are coupled to system bus 708. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 744 or other type of display device may also be connected to system bus 708 via an interface, such as a video adapter 746. Video adapter 746 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 744, other output peripheral devices may include components such as speakers (not shown) and a printer 748, which may be connected to computer 702 via input/output interfaces 742.

Computer 702 may operate in a networked environment using logical connections to one or more remote computers, such as a remote computing device 750. By way of example, remote computing device 750 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 750 is illustrated as a portable computer that may include many or all of the elements and features described herein with respect to computer 702.

Logical connections between computer 702 and remote computer 750 are depicted as a local area network (LAN) 752 and a general wide area network (WAN) 754. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 702 is usually connected to LAN 752 via a network interface or adapter 756. When implemented in a WAN networking environment, computer 702 typically includes a modem 758 or other component for establishing communications over WAN 754. Modem 758, which may be internal or external to computer 702, may be connected to system bus 708 via input/output interfaces 742 or any other appropriate mechanism(s). It is to be appreciated that the illustrated network connections are examples and that other manners for establishing communication link(s) between computers 702 and 750 may be employed.

In a networked environment, such as that illustrated with operating environment 700, program modules or other instructions that are depicted relative to computer 702, or portions thereof, may be fully or partially stored in a remote media storage device. By way of example, remote application programs 760 reside on a memory component of remote computer 750 but may be usable or otherwise accessible via computer 702. Also, for purposes of illustration, application programs 730 and other processor-executable instructions such as operating system 728 are illustrated herein as discrete blocks, but it is recognized that such programs, components, and other instructions reside at various times in different storage components of computing device 702 (and/or remote computing device 750) and are executed by processor(s) 704 of computer 702 (and/or those of remote computing device 750).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. A processor-accessible storage medium storing instructions that, when executed by a processor, perform acts comprising:
   establishing respective hot zones for respective ones of multiple UI elements representing objects selected by a user;
   presenting, when a focus enters a hot zone associated with an item in a list of items, at least one floating action button relevant to the represented objects selected by the user to the right of an item entry in the list of items listed in user selectable groups;
   wherein the focus comprises at least one of a pointer focus or a key focus; and wherein the hot zone comprises at least one of a hover over zone or a key indication zone;
   presenting a context menu upon activation of the floating action button;
   presenting a collapse or expand button for each user selectable group, the collapse button being configured to hide items in the user selectable group upon activation and the expand button being configured to reveal items in the group upon activation;
   presenting text of the item entry as a bubble above or below the hover over zone when obscured by the floating action button;
   removing the presented at least one floating action button from the UI when the focus leaves the hot zone;

performing an action corresponding to the at least one floating action button when the at least one floating action button is activated, wherein the action affects one or more of the objects selected by the user; and wherein the at least one floating action button and the action corresponding thereto are dependent upon a type of an item corresponding to the UI element that is associated with the hot zone in focus or a mode of an application utilizing the user interface, or both.

2. The processor-accessible storage medium as recited in claim 1, wherein the instructions are further adapted to present the at least one floating action button such that the at least one floating action button at least partially overlaps the hot zone.

3. The processor-accessible storage medium as recited in claim 1, wherein the instructions are further adapted to establish a particular hot zone for a particular UI element such that the particular hot zone surrounds the particular UI element.

4. One or more processor-accessible storage media comprising processor-executable instructions that when executed by a processor, performs the following:

creating a user interface (UI) element representing an object including a hot zone floating action button effectuator that is adapted to establish a hot zone for the object selected by the user, the hot zone floating action button effectuator including a focus monitor and an action button presenter;

monitoring with the focus monitor a location of a focus indicator to determine if the focus indicator becomes located at the hot zone;

presenting with the action button presenter one or more action buttons to the right of an item entry in a list of items listed in user selectable groups when the focus indicator is determined to be located at the hot zone;

presenting a collapse or expand button for each of the user selectable groups, the collapse button being configured to hide items in the group upon activation and the expand button being configured to reveal items in the group upon activation;

presenting text of the item entry as a bubble above or below the hover over zone when obscured by the action button; and modifying the object upon activation by the user of the action button to the right of an item entry.

5. The one or more processor-accessible storage media as recited in claim 4, wherein the one or more action buttons are ascertained by the action button presenter from a data structure that maps the UI element to the one or more action buttons.

6. The one or more processor-accessible storage media as recited in claim 5, wherein one or more actions corresponding to the one or more action buttons are related to an item corresponding to the UI element by context and/or subject matter.

7. The one or more processor-accessible storage media as recited in claim 4, wherein the hot zone floating action button effectuator further includes an action implementer; the action implementer adapted to implement a particular action corresponding to a particular action button of the one or more action buttons when the particular action button is detected to be activated with a standard mechanism.

8. The one or more processor-accessible storage media as recited in claim 7, wherein the processor-executable instructions further include a UI component that presents a context menu when the particular action button of the one or more action buttons is activated with a non-standard mechanism.

9. The one or more processor-accessible storage media as recited in claim 4, wherein the hot zone floating action button effectuator is further adapted to visually delete from a display screen the presented one or more action buttons when the focus indicator is determined by the focus monitor to be moved beyond the hot zone.

10. The one or more processor-accessible storage media as recited in claim 4, wherein the focus indicator comprises at least one of a key indicator or a pointer indicator; and wherein the hot zone comprises at least one of a hover over zone or a key indication zone.

11. The one or more processor-accessible storage media as recited in claim 10, wherein the key indicator or the pointer indicator comprises:

encircling the key indication zone or hover over zone with a solid or dashed line;

changing a background color of the key indication zone or hover over zone;

changing a size of the key indication zone or hover over zone;

increasing size of text within the key indication zone or hover over zone; or inverting the video of the key indication zone or hover over zone.

12. The one or more processor-accessible storage media as recited in claim 10, wherein the key indicator or the pointer indicator comprises applying a graphical halo effect to the key indication zone or hover over zone.

13. The one or more processor-accessible storage media as recited in claim 10, wherein the key indicator or the pointer indicator comprises darkening or brightening the key indication zone or hover over zone.

14. The one or more processor-accessible storage media as recited in claim 4, wherein the processor-executable instructions further include at least one of an application program or an operating system program; and wherein the hot zone floating action button effectuator comprises at least part of a UI component of the application program or the operating system program.

15. A method comprising:

determining by a computer processor if a focus has entered a hot zone representing a selected object;

causing presentation of one or more relevant floating action button icons if the focus is determined to have entered the hot zone, the one or more relevant floating action button icons associated with the hot zone being and configured to reveal a group of items upon activation;

presenting upon activation of one of the floating action buttons the group of items as a bubble proximate to the hover over zone when obscured by the floating action button; and affecting the selected object upon activation of one of the group of items.

16. The method as recited in claim 15, wherein:

the determining comprises:

determining if a focus indicator is located at the hot zone;

the presenting comprises:

ascertaining the one or more floating action button icons that are associated with the hot zone using a mapping data structure; and displaying the ascertained associated floating action button icons such that at least one action button icon of the floating action button icons at least partially overlaps the hot zone.

17. The method as recited in claim 15, further comprising:

checking if the focus is no longer within the hot zone; and if the focus is no longer within the hot zone, removing the one or more floating action button icons.

18. The method as recited in claim 15, further comprising:
detecting if at least one action button of the one or more floating action button icons is activated using a standard activation mechanism;
if at least one action button icon is detected to be activated using the standard activation mechanism, implementing an action corresponding to the activated at least one action button icon;
detecting if at least one action button of the one or more floating action button icons is activated using a non-standard activation mechanism; and
if at least one action button is detected to be activated using the non-standard activation mechanism, presenting a context menu that is related to an action corresponding to the activated at least one action button icon.

19. A processor-accessible storage medium storing instructions that, when executed by a processor, perform acts comprising:
establishing a hot zone corresponding to an item on a display;
presenting a hover over menu when a user focus enters the hot zone;
presenting within the hover over menu a plurality of floating action button icons;
presenting, upon activation of one of the plurality of floating action button icons, a further context menu adjoining the activated floating action button icon, the context menu presenting options related to the activated floating action button icon, wherein each option comprises an icon; and
modifying the item upon activation of one of the context menu options.

20. A processor-accessible storage medium storing instructions that, when executed by a processor, perform acts comprising:
establishing a first hot zone corresponding to an item displayed on a display;
presenting a hover over menu when a user focus enters the first hot zone;
presenting within the hover over menu a plurality of floating action button icons which are relevant to the item;
presenting, upon activation of one of the plurality of floating action button icons, a further context menu adjoining the activated floating action button icon, the context menu presenting options related to the activated floating action button icon, wherein each option comprises an icon;
altering presentation of the icon presented in the context menu when the user focus enters a second hot zone associated with the icon.

21. The one or more processor-accessible storage media as recited in claim 20, further comprising presenting a focus indicator upon entry to the first hot zone, second hot zone, or both, the focus indicator comprising:
encircling the zone with a solid or dashed line;
changing a background color of the zone;
changing a size of the zone;
increasing size of text within the zone; or
inverting the video of the zone.

22. The one or more processor-accessible storage media as recited in claim 20, further comprising applying a graphical halo effect to the first hot zone, second hot zone, or both, when focused on the zone.

* * * * *